United States Patent [19]

Bates et al.

[11] Patent Number: 4,919,582

[45] Date of Patent: Apr. 24, 1990

[54] METHOD AND APPARATUS FOR LOADING AUTOMOBILES INTO A CARGO CONTAINER

[75] Inventors: H. John Bates, Yorba Linda; Kermit L. Achterman, La Canada, both of Calif.; Peter Gearin, Portland; Terence Halpin, West Linn, both of Oreg.

[73] Assignee: Greenbrier Intermodal, Inc., Lake Oswego, Oreg.

[21] Appl. No.: 181,684

[22] Filed: Apr. 14, 1988

[51] Int. Cl.⁵ .................. B60P 1/64; B65G 67/02
[52] U.S. Cl. .................. 414/233; 410/9; 410/16; 410/18; 414/228; 414/253; 414/341; 414/347; 414/399; 414/400; 414/416; 414/495; 414/498; 414/499; 414/786
[58] Field of Search ........... 414/390–393, 414/395, 396, 398–401, 403, 422, 416, 498, 404, 495, 500, 331, 227, 228, 233–235, 241, 253, 341, 345, 347, 786, 608, 499; 410/3, 4, 13, 16, 7–9, 18, 24–26, 29, 29.1, 30

[56] References Cited

U.S. PATENT DOCUMENTS

| | | | |
|---|---|---|---|
| 2,605,912 | 8/1952 | Small et al. | 414/390 X |
| 3,710,961 | 1/1973 | Bomstein | 414/400 X |
| 4,124,119 | 11/1978 | Nordstrom | 410/13 X |
| 4,597,712 | 7/1986 | Smith | 414/253 X |
| 4,668,142 | 5/1987 | Fity et al. | 410/26 |
| 4,768,916 | 9/1988 | Gearin et al. | 414/498 |
| 4,797,049 | 1/1989 | Gearin et al. | 414/198 X |

FOREIGN PATENT DOCUMENTS

| | | | |
|---|---|---|---|
| 183425 | 9/1985 | Japan | 414/416 |
| 1063744 | 12/1983 | U.S.S.R. | 414/331 |
| 2183620 | 6/1987 | United Kingdom | 414/608 |

Primary Examiner—David A. Bucci
Attorney, Agent, or Firm—Chernoff, Vilhauer, McClung & Stenzel

[57] ABSTRACT

A loader includes a sleeve support which will carry in a raised position a lightweight open-centered sleeve, of the type which is capable of holding a plurality of automobiles. An automobile support, capable of carrying the automobiles which will comprise one level when loaded into the sleeve, is located below the sleeve. A lifting device moves the sleeve support and the automobile support together to insert the automobiles into the sleeve from its bottom. Latching mechanisms which attach the automobiles to the sleeve are movable between loading positions, where the automobiles can be inserted past them, and latching positions where they will engage the automobiles' tires. The loader is capable of removing the sleeves from cargo containers for loading and/or unloading and then placing them back into the containers when this procedure is completed. The apparatus also is capable of folding the sleeves to their collapsed position and of expanding them to their erected position.

40 Claims, 14 Drawing Sheets

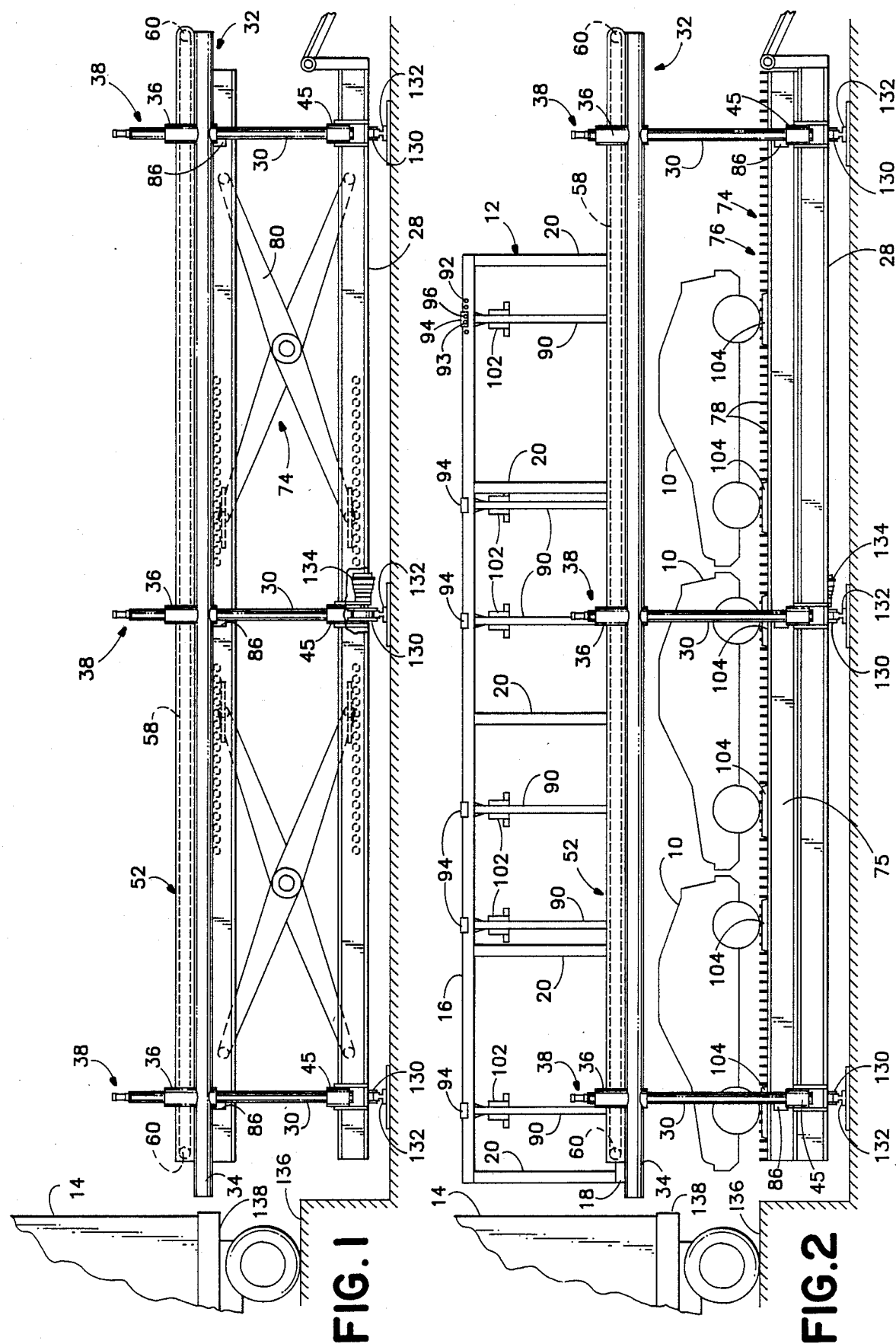

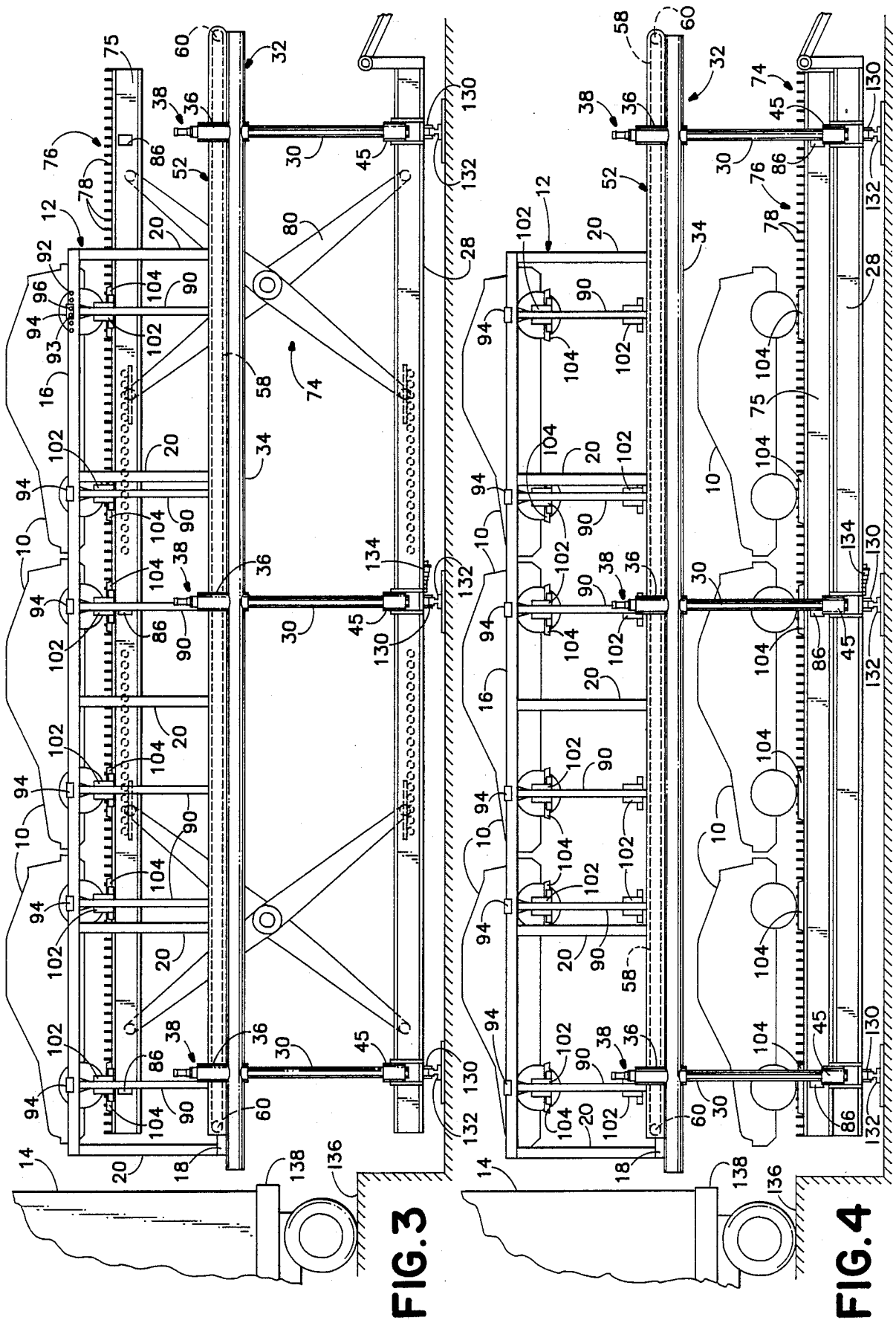

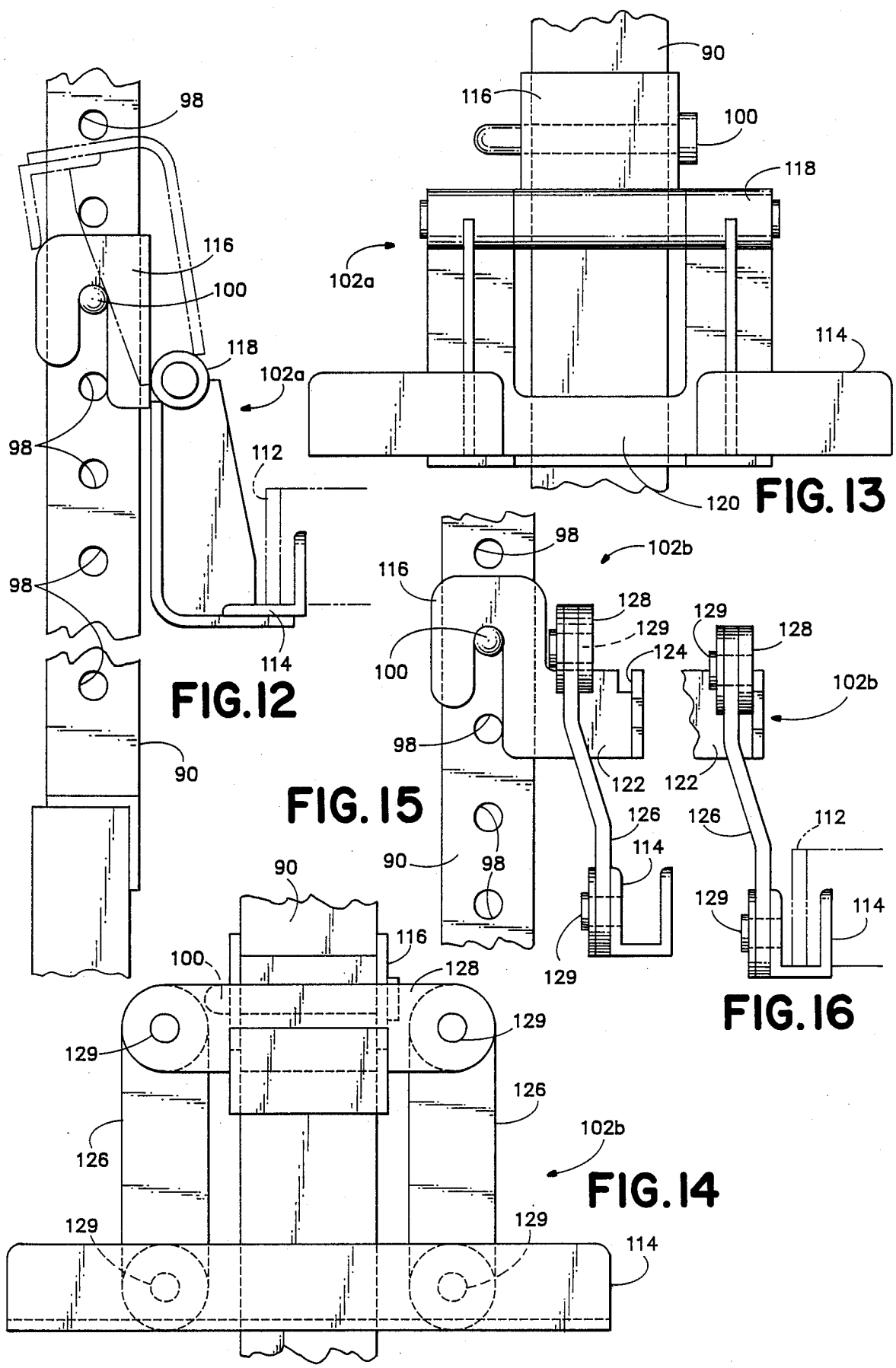

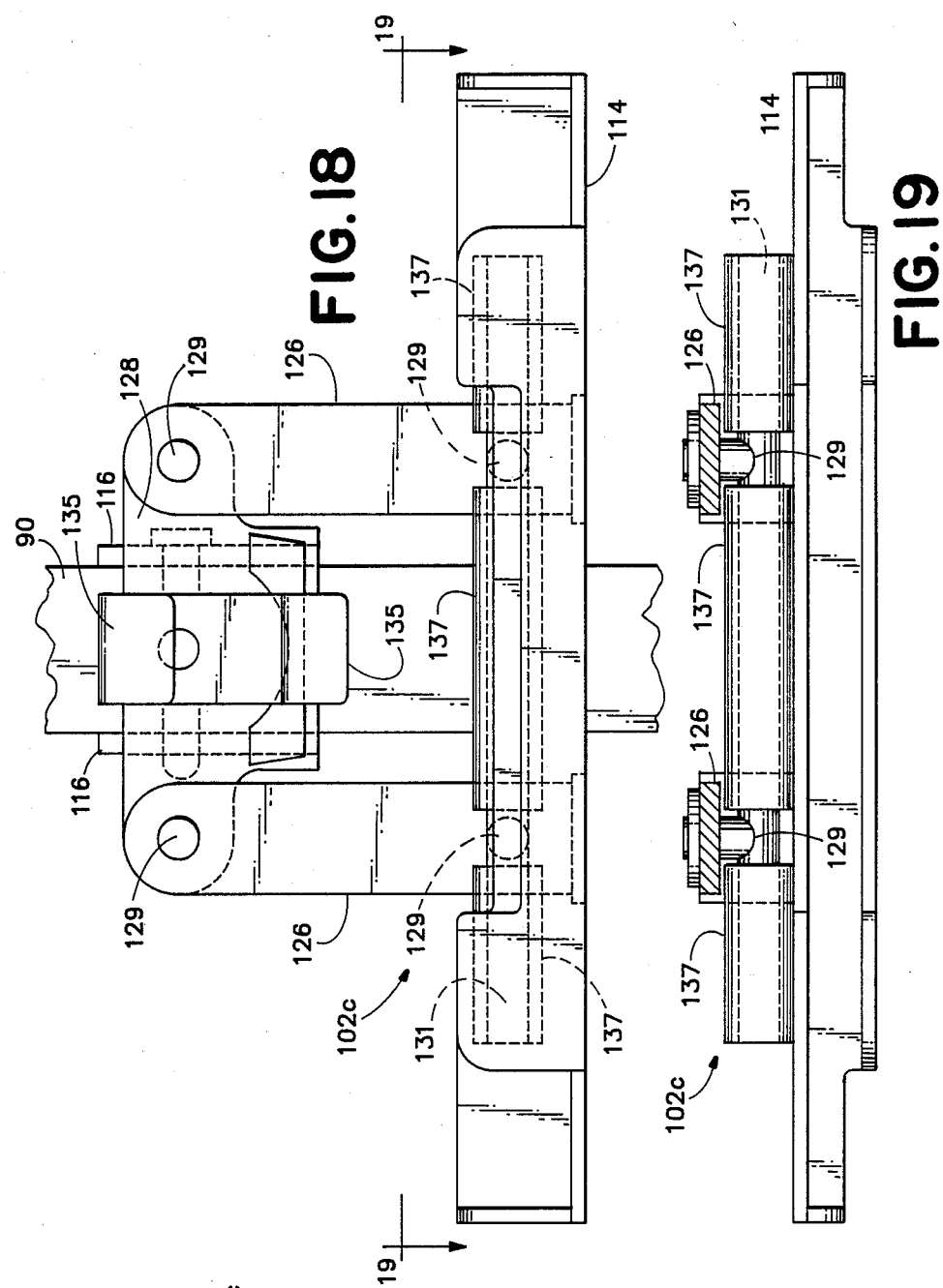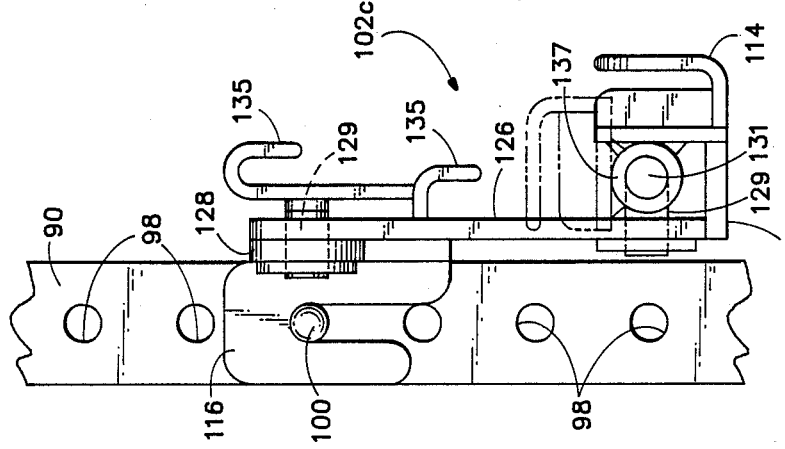

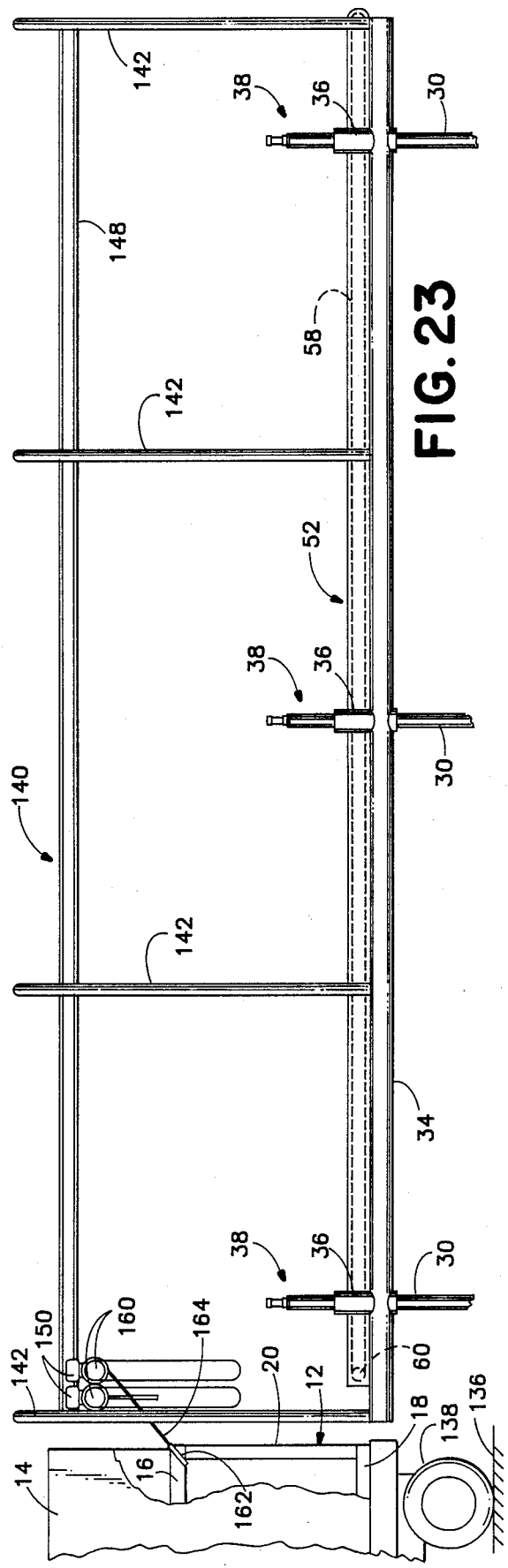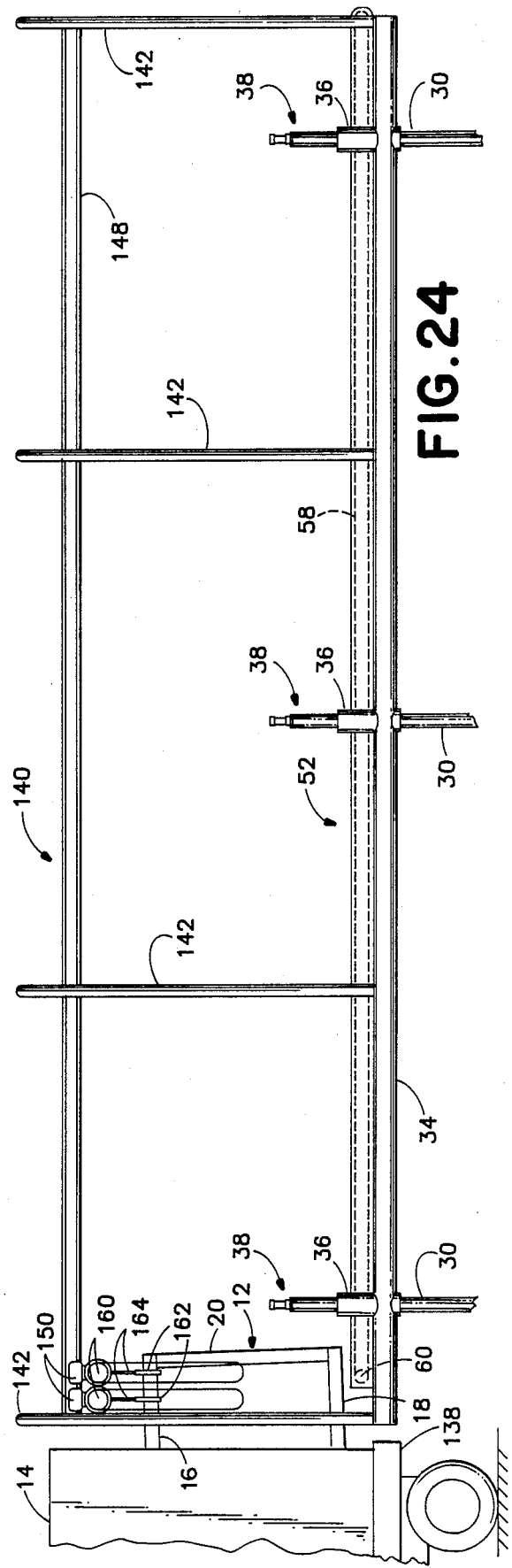

METHOD AND APPARATUS FOR LOADING AUTOMOBILES INTO A CARGO CONTAINER

BACKGROUND OF THE INVENTION

This invention relates to a device for loading automobiles into and unloading automobiles from an open-centered sleeve which is designed for carrying a plurality of automobiles and being inserted into a cargo container of the type which is provided in a variety of standardized sizes.

Shipping automobiles from the factory where they are built to their final destination often requires several different modes of transportation. Typically, automobiles are first shipped in quantity from the manufacturer to a particular city or region by boat or railcar and then are shipped to a distribution center or dealer by truck. In fact, for automobiles imported into the United States from abroad, all three modes of transportation often are used. Since the automobiles must be individually loaded and unloaded, as well as individually secured, in each mode of transportation, this procedure is expensive as it is both labor-intensive and slow. While cargo containers have long been used to ship goods in all three of these modes of transportation without the necessity of reloading the goods individually each time a change in the type of transportation occurs, only recently has a system been devised which permits automobiles to be loaded easily into such containers. This system, which is disclosed in patent application Ser. No. 040,469, filed Apr. 20, 1987 entitled SYSTEM FOR LOADING MOTOR VEHICLES INTO STANDARD CARGO-CARRYING ENCLOSURES, now U.S. Pat. No. 4,768,916 uses a lightweight open-centered sleeve to support two vertically-separated levels of automobiles. The automobiles are supported in the sleeve by vehicle-supporting assemblies which are hung on vertical tension members that attach to the sides of the sleeve. The sleeve and automobiles then are loaded into and out of the container as a unit.

Heretofore, a sleeve has been loaded one automobile at a time by driving an automobile into it, placing the associated vehicle-supporting assemblies under each of its wheels and then using external gantries to jack the supporting assemblies and the automobile up the tension members to the desired height in the sleeve. The supporting assemblies are then attached to the tension members. Since a sleeve can hold up to six automobiles, this system is time consuming. In addition, driving an automobile into a sleeve and opening its door when it is in the sleeve creates a possibility of damaging or scratching the paint or its sides or doors. What is needed, therefore, is a method and apparatus for loading an entire level of automobiles into a sleeve at one time without the necessity of driving them into the sleeve.

Since these sleeves allow carrying automobiles in cargo containers without the necessity of a specially designed automobile support apparatus that is affixed to the container, the sleeves have been made collapsible in order that several collapsed sleeves can be carried in a single container. Thus, the remaining containers are free to carry other cargo on the return trip. However, heretofore this advantage has not been fully realized since the sleeves are heavy and cumbersome and it is difficult to collapse them. Accordingly, it is desirable to have an apparatus which permits collapsing the sleeves easily and quickly.

SUMMARY OF THE INVENTION

The foregoing objectives are achieved in the subject invention by providing an automobile support ramp which will carry a sufficient number of automobiles to fill one level of a sleeve. A sleeve support is arranged to support an empty sleeve in a raised position above this ramp. Once the automobiles are in place on the ramp a lifting device is used to move the ramp and sleeve support relative to one another so that the automobiles are inserted into the sleeve from its bottom. The automobiles are affixed to the sleeve and the sleeve support and ramp are separated from one another. A second level of automobiles then is placed on the ramp and the procedure is repeated to place this level into the sleeve. When a container carrying one of the loaded sleeves reaches its destination the apparatus is used to unload the automobiles from the sleeve by reversing the foregoing procedure.

The sleeve support contains tracks which carry wheels located in the bottoms of the sleeves, and the distance between these tracks can be changed in order to accommodate sleeves having different widths. A chain drive system associated with the sleeve support engages the sleeve when it is located in a cargo container and pulls it onto the tracks, and then pushes the sleeve back into the container when it has been processed.

When automobiles are placed in the sleeve, their wheels are supported by cradles which extend across the sleeve and are attached to the tension members that are connected to the sides of the sleeve. The cradles are placed on the ramp below the level of the automobile tires before the automobiles are placed onto the ramp. After the lifting device has raised the automobiles to the proper level, the cradles are attached to the tension members by cradle latches which are connected to the tension members. The cradle latches are arranged to be moved to loading positions which permit the cradles to pass by them and to latching positions where they will engage the extremities of the cradles. Thus, if the cradle latches are moved to their loading position before the automobiles then are inserted into the sleeve by the lifting device and then are moved to their latching position after the automobiles have passed them, they automatically engage the cradles when the lifting device is retracted.

In a preferred embodiment of the invention the lifting device is first used to align the sleeve support with a cargo container containing a sleeve so that the sleeve can be pulled onto the sleeve support tracks. The lifting device then raises the sleeve support to its highest point where it is secured by a latch assembly. The lifting device then is used to raise the ramp containing the automobiles into the sleeve so that the automobiles can be affixed to the sleeve. After the sleeve is loaded, the lifting device is used to lower the sleeve support to where it is aligned with the container again so that the sleeve can be removed from it.

The present invention also provides an apparatus for supporting both sides of one of the sleeves independently of one another from above and moving the sides of the sleeve toward one another so that it can be folded into a collapsed position to facilitate storing several sleeves in a single container. This is accomplished by two sets of chain hoists with each set being mounted on carriages which are movable longitudinally on a beam which extends along the sleeve support. These beams in turn are supported by carriages which allow the beams to be moved back and forth relative to one another. There are two chain hoists in each set and each has a hook which can be attached to the upper corner of the sleeves.

In operation the beams are aligned with the sides of an erected sleeve stored in a cargo container and all four chain hoists are moved to the ends of the beams which are adjacent to the sleeve. The hooks from the chain hoist furthest away from the sleeve are attached to the near corners of the sleeve and these chain hoists are retracted, which causes one end of the sleeve to be raised and the sleeve to be partially pulled out of the container. After their chains have been retracted these chain hoists are moved along the beams to pull the sleeve further out of the container to the point where the hooks from the other two chain hoists can be attached to the far corners of the sleeve. The other chain hoists then are retracted to lift the other end of the sleeve and pull it completely out of the container, and the two beams are moved toward one another to collapse the sleeve. The foregoing procedure is reversed to place the collapsed sleeve back into the container.

Accordingly, it is a principal object of the present invention to provide an apparatus for loading automobiles into and out of a lightweight sleeve.

It is a further object of the present invention to provide such an apparatus which loads or unloads an entire layer of automobiles at one time.

It is a further object of the present invention to provide such an apparatus which loads and unloads the automobiles into the sleeve from its bottom.

It is a still further object of the present invention to provide such an apparatus which will remove a sleeve from a cargo container for loading or unloading and then place it back into the container.

It is a yet further object of the present invention to provide such as apparatus which attaches the automobiles to the sleeve as a group automatically when they are properly indexed.

It is a yet further object of the present invention to provide a method for loading and unloading automobiles in a lightweight sleeve.

It is a further object of the present invention to provide an apparatus for removing lightweight sleeves from a cargo container, folding them to a collapsed position, and then placing them back into the container.

It is a still further object of the present invention to provide a method for removing lightweight sleeves from a cargo container, folding them to a collapsed position, and then placing them back into the container.

The foregoing and other objectives, features and advantages of the present invention will be more readily understood upon consideration of the following detailed description of the invention taken in conjunction with the accompanying drawings.

BRIEF DESCRIPTION OF THE DRAWINGS

FIG. 1 is a side elevation view, partially broken away to show hidden detail, of an apparatus for loading automobiles into and out of a lightweight sleeve oriented in a position where it is ready to receive a sleeve from an adjacent truck trailer.

FIG. 2 is a side elevation view of the apparatus supporting a sleeve in its loading position with a first level of automobiles positioned on the apparatus preparatory to being inserted into the sleeve.

FIG. 3 is a side elevation view of the apparatus with the first level of automobiles having been inserted into the sleeve and being supported by the apparatus at the location where they will be attached to the sleeve.

FIG. 4 is a side elevation view of the apparatus with the first level of automobiles attached to the sleeve and a second level of automobiles positioned on the apparatus preparatory to being inserted into the sleeve.

FIG. 12 is a side elevation view of a first embodiment of a cradle latch which is an element of the present invention, showing the shelf in a raised position in phantom line.

FIG. 3 is a front elevation view of the cradle latch of FIG. 12.

FIG. 14 is a front elevation view of a second embodiment of the cradle latch.

FIG. 15 is a side elevation view of the cradle latch of FIG. 14.

FIG. 16 is a fragmentary side elevation view of the cradle latch of FIG. 14, located in another position.

FIG. 17 is a side elevation view of a third embodiment of the cradle latch, showing the shelf in a raised position in phantom line.

FIG. 18 is a front elevation view of the cradle latch of FIG. 17.

FIG. 19 is a sectional view taken along the line 19—19 in FIG. 18.

FIGS. 23-26 are side elevation views, showing the sequence of operation of the sleeve unloading folding feature of the subject invention.

DETAILED DESCRIPTION OF THE PREFERRED EMBODIMENT

Figure 6:
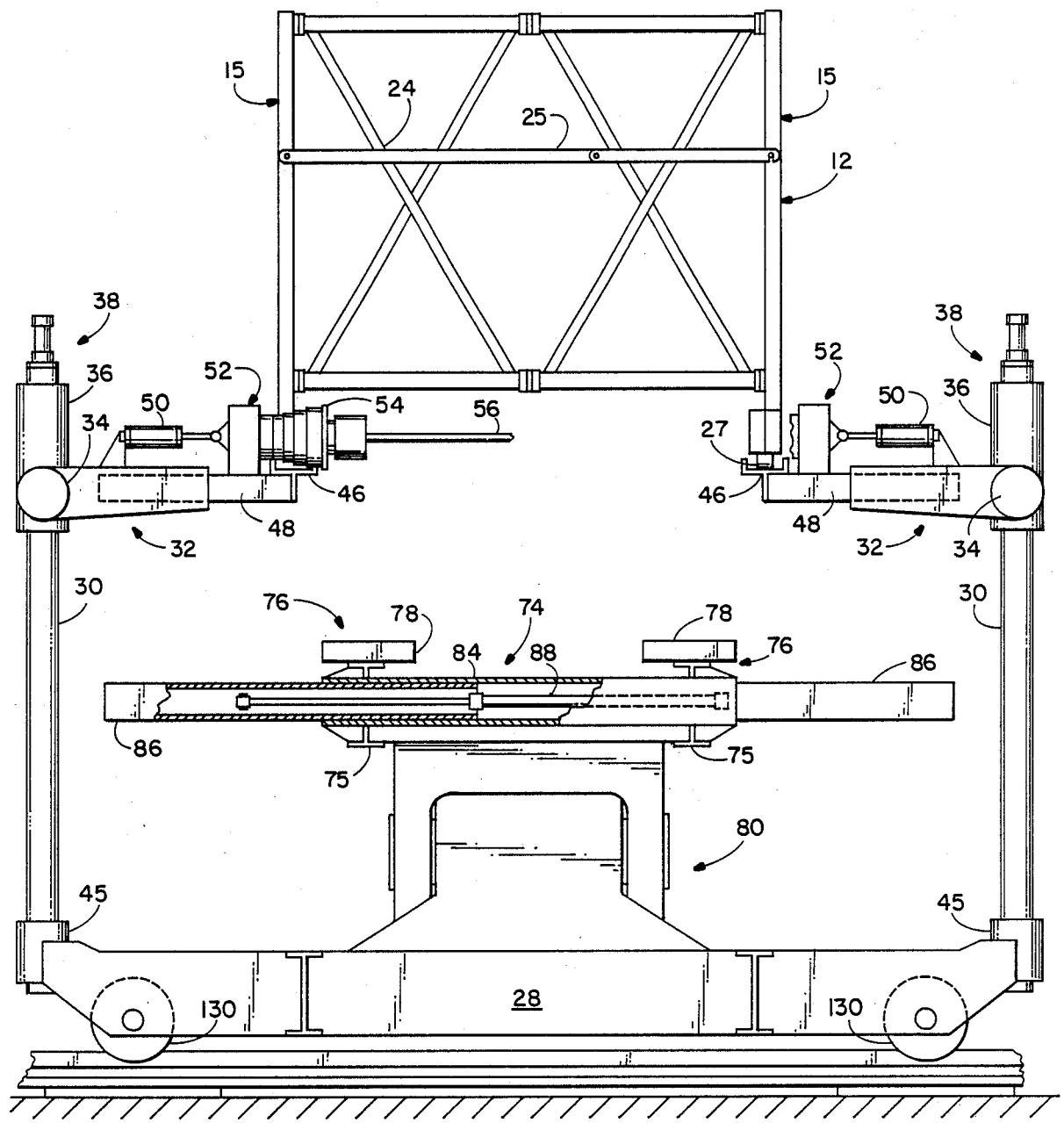
FIG. 6 is an end elevation view, partially broken away, and at an enlarged scale, of the apparatus shown in FIG. 1.
Figure 7:
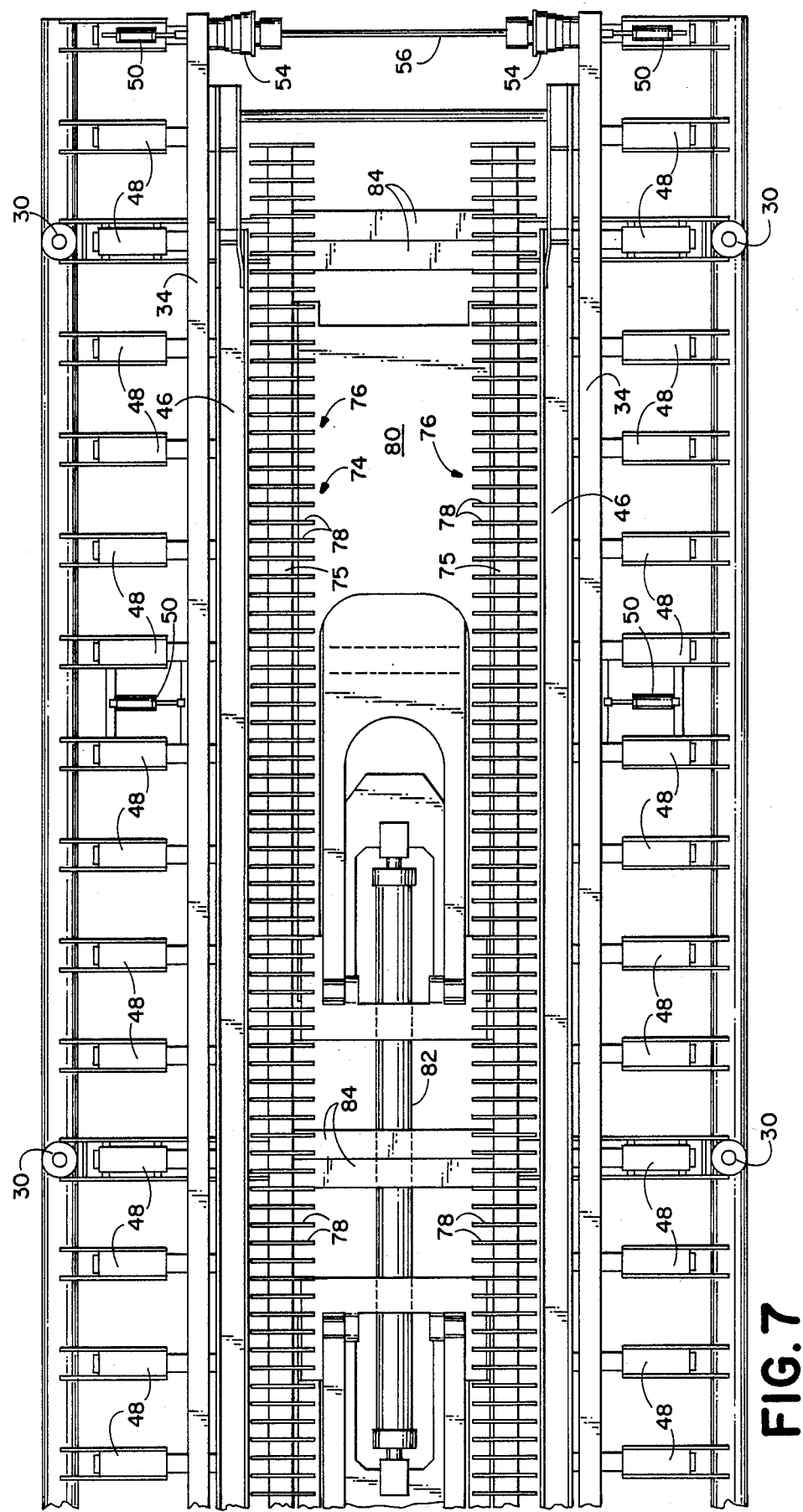
FIG. 7 is a fragmentary plan view, at an enlarged scale, of the apparatus of FIG. 1.
Figure 29:
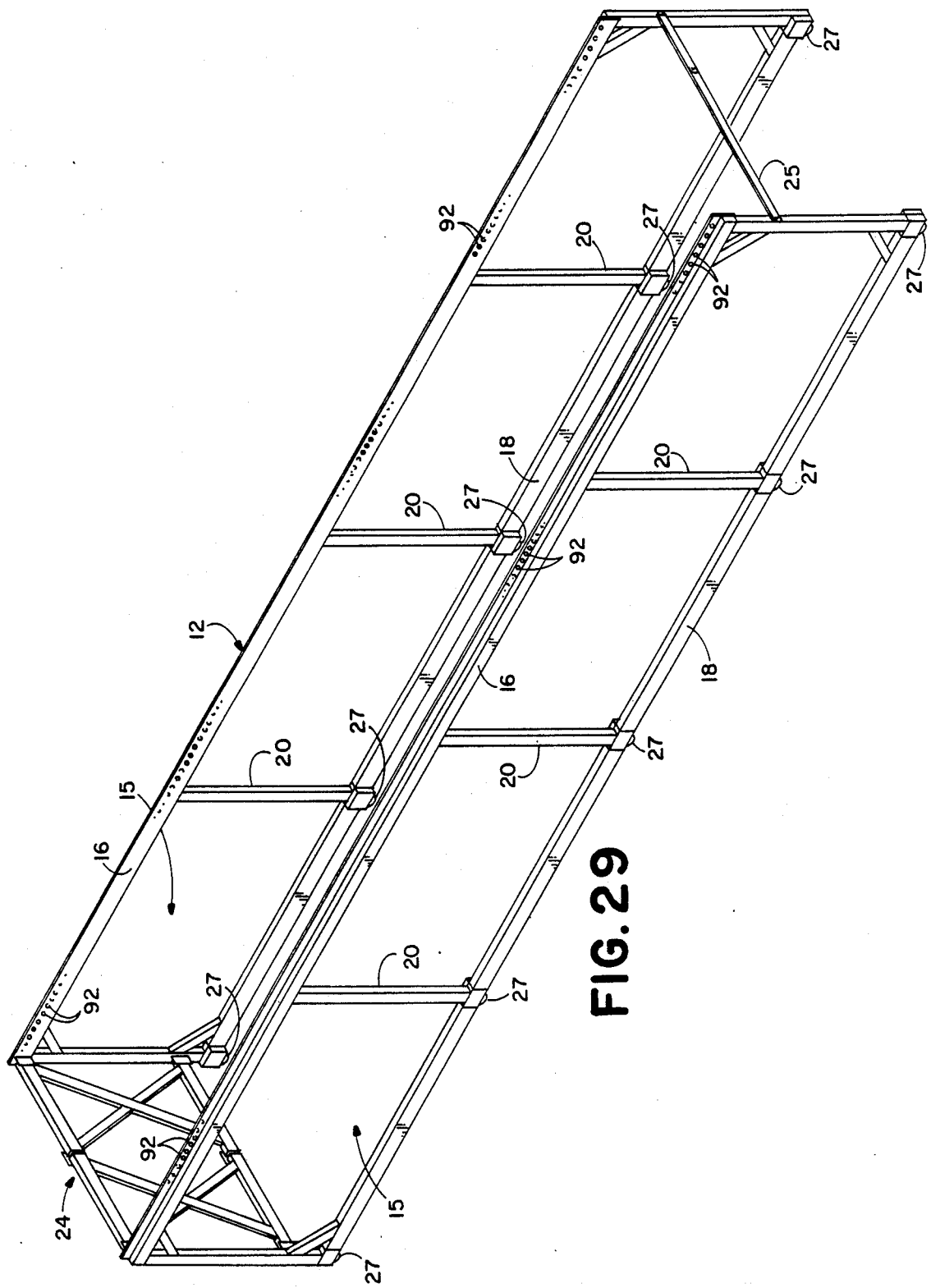
FIG. 29 is a perspective view of a sleeve which is an element of the invention.

Referring to FIGS. 1, 6 and 7 of the drawings, the loader of the present invention is used to load automobiles 10 into or out of a lightweight sleeve 12 which is dimensioned to fit in a standard cargo-carrying container 14. These containers come in several different sizes depending on the cargo which will be carried in them, however, each size is dimensioned according to a detailed set of parameters. The sleeve 12, which is shown in FIG. 29, comprises an open centered rectangular framework having a length which will accommodate several automobiles and a width which permits an automobile to fit into it without much clearance on either side. Since the side clearance is critical, for reasons which will be explained below, it is necessary to provide sleeves having different widths in order to accommodate automobiles of all sizes. In addition, sleeves will preferably be provided in different lengths in order to accommodate varying amounts of automobiles.

The sides 15 of the sleeve include top beams 16 and bottom beams 18 which are rigidly interconnected through a plurality of spaced-apart vertical beams 20. The sides 15 are tied together at one end of the frame, which is closed, by means of an end frame 24. At the other end of the frame, which is open, the sleeve is tied together by a crossbar 25 which spans between the sides. In the embodiment illustrated, the end frame 24 is foldable and the crossbar 25 can be disconnected from one of the sides and pivoted toward the other side to permit the sleeve to be collapsed to a folded position where the sides are adjacent to one another. This feature is not essential, however, and the loader of the present invention could be used with noncollapsible sleeves as well. Rotatably mounted to the bottom of each side 15 of the sleeve are a plurality of wheels 27 which permit the sleeve to be moved parallel to its elongate axis.

Referring again to FIGS. 1, 6 and 7, the loader comprises an elongate frame 28 having a length and width which will permit it to support any size sleeve 12 it will be used to load. The frame structurally supports all of the remaining elements of the loader and is mounted on wheels 130 which allow it to be moved transversely to its longitudinal extent on tracks 132, FIG. 6. A motor 134, FIG. 1, powers the wheels, and suitable controls (not shown) are provided to stop and start the motor and reverse its direction. In the embodiment illustrated in the drawings the tracks are located in an area below a loading platform 136 which allows a truck 138 carrying a container 14 to back up adjacent to the loader. However, the loader can be used in other environments and the sleeve can be handled in a wide range of ways before and after it is processed by the loader. Extending upwardly from each side of the frame is a plurality of upright guide posts 30. In the embodiment illustrated there are three guide posts in each set and they are cylindrical, however, more or less guide posts could be utilized and they could have other cross-sectional shapes. Slidably mounted on each set of guide posts is a sleeve support 32. Stops 45 located at the bottoms of the guide posts prevent the sleeve supports from dropping completely to the level of the frame.

Figure 8:
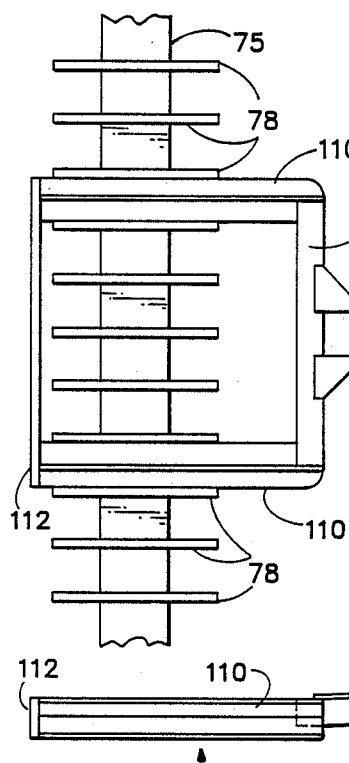
FIGS. 8 and 9 are sectional detail views showing the latching apparatus which is a feature of the present invention.
Figure 9:
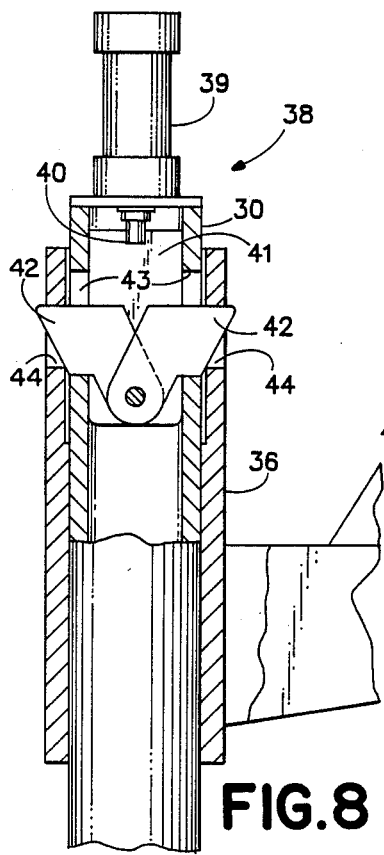

As can be best seen in FIG. 1, each sleeve support comprises an elongate rail 34 having hollow cylindrical collars 36 attached to it which are arranged to slidably communicate with the guide posts 30. Thus, the rail is movable vertically along the guide posts. A latch assembly 38 associated with each guide post and collar permits the rail 34 to be locked to the guide post in a loading position proximate the upper extremities of the guide posts. Referring now also to FIGS. 8 and 9, each latch assembly comprises an actuator 39 which is mounted on top of its associated guide post and has a piston rod 40 which can be moved between an extended position, FIG. 9, and a retracted position, FIG. 8. The piston rod is connected to a tab 41 which fits into the guide post and has a pair of latches 42 pivotally attached to it. When the piston rod 40 is in its extended position the latches 42 are inside of the guide post. However, when the piston is retracted, biasing means (not shown) causes the latches to rotate outwardly through slots 42 which are located in the sides of the guide posts. When the latches are rotated outwardly and the sleeve support 32 is moved to the top of the guide posts the latches are inserted into mating slots 44 located in the collars 36. Thus, when the sleeve support is lowered, the latches become wedged between the tops of the slots 44 in the collars and the bottoms of the slots 42 in the guide posts and the sleeve support becomes locked to the guide post. To release the latching mechanism 38 the sleeve support needs to be raised slightly and the piston rod 40 extended from the actuators thereby pulling the latches back into the guide posts.

As can be best seen in FIGS. 6 and 7, each rail 34 supports a U-shaped track 46 which receives the wheels 27 of the sleeve 12. Each track is attached to its associated rail 34 by means of a plurality of freely movable piston cylinders 48, and by three hydraulically or pneumatically operated piston cylinders 50. The piston cylinders 50 have an appropriate fluid supply system and controls (not shown) which permit their pistons to be extended or contracted as desired. Thus, each track 46 can be moved back and forth relative to the rail which supports it and the distance between the tracks can be varied to accommodate sleeves having different widths. The tracks 46 generally extend past at least one end of the frame 28, FIG. 1, so that a truck 38 can be backed up into contact with them.

Figure 10:
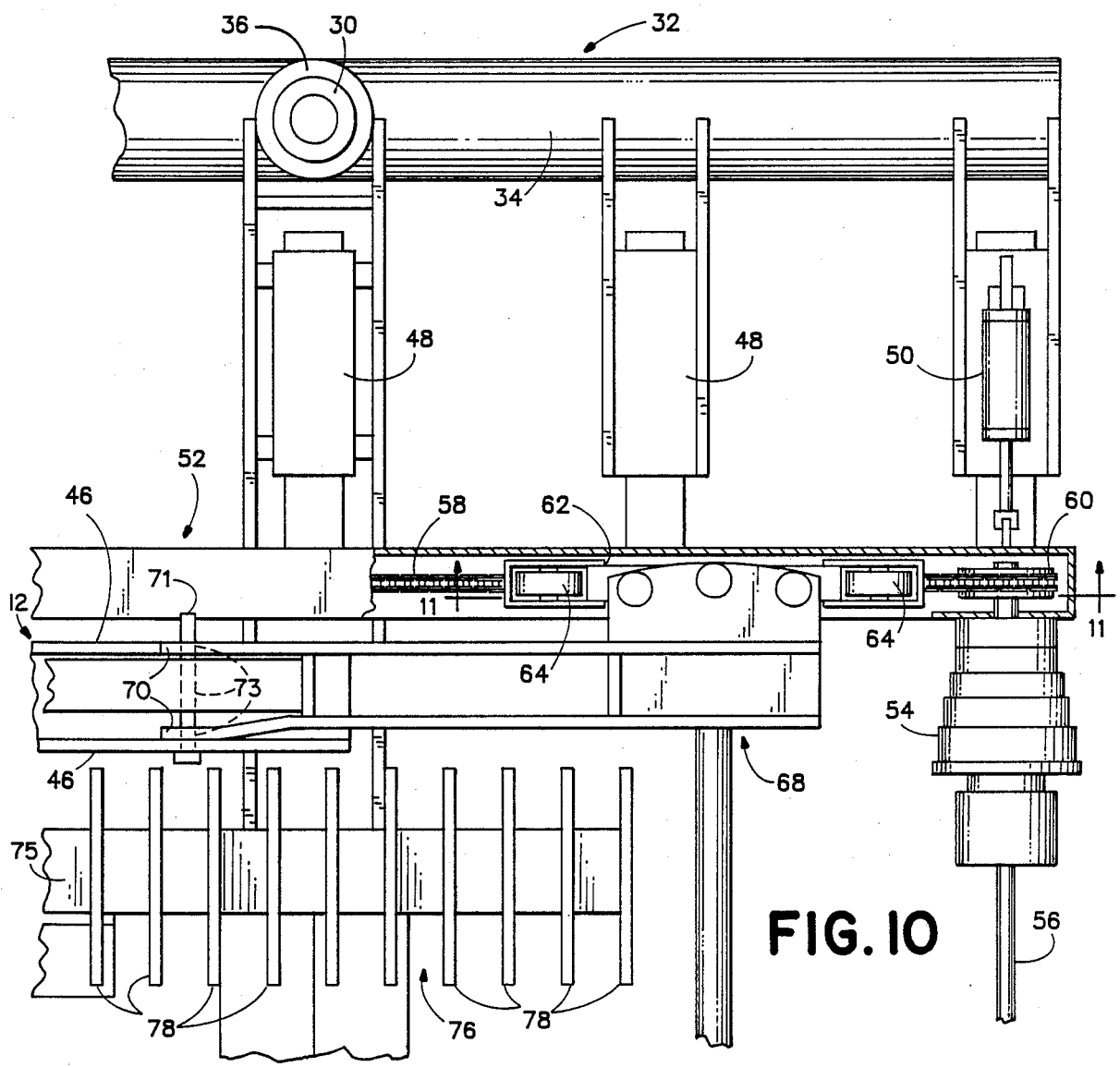
FIG. 10 is a fragmentary top view of the apparatus, partially broken away to show hidden detail.
Figure 11:
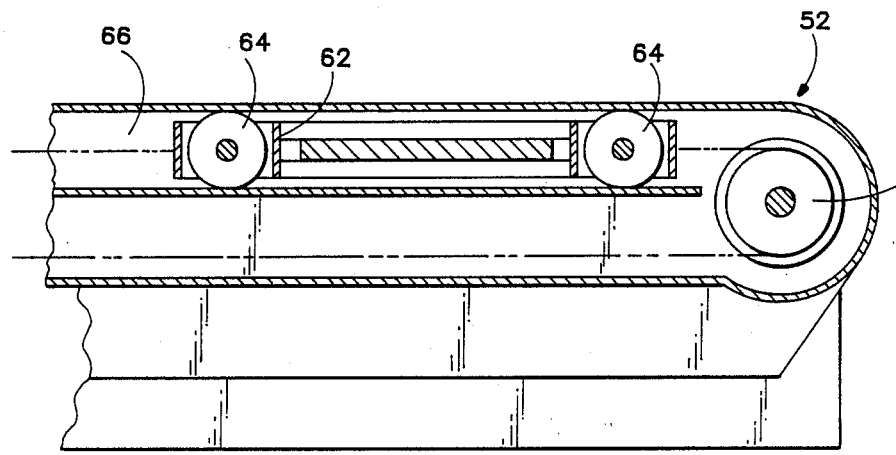
FIG. 11 is a sectional view taken along the line 11—11 in FIG. 10.
Figure 25:
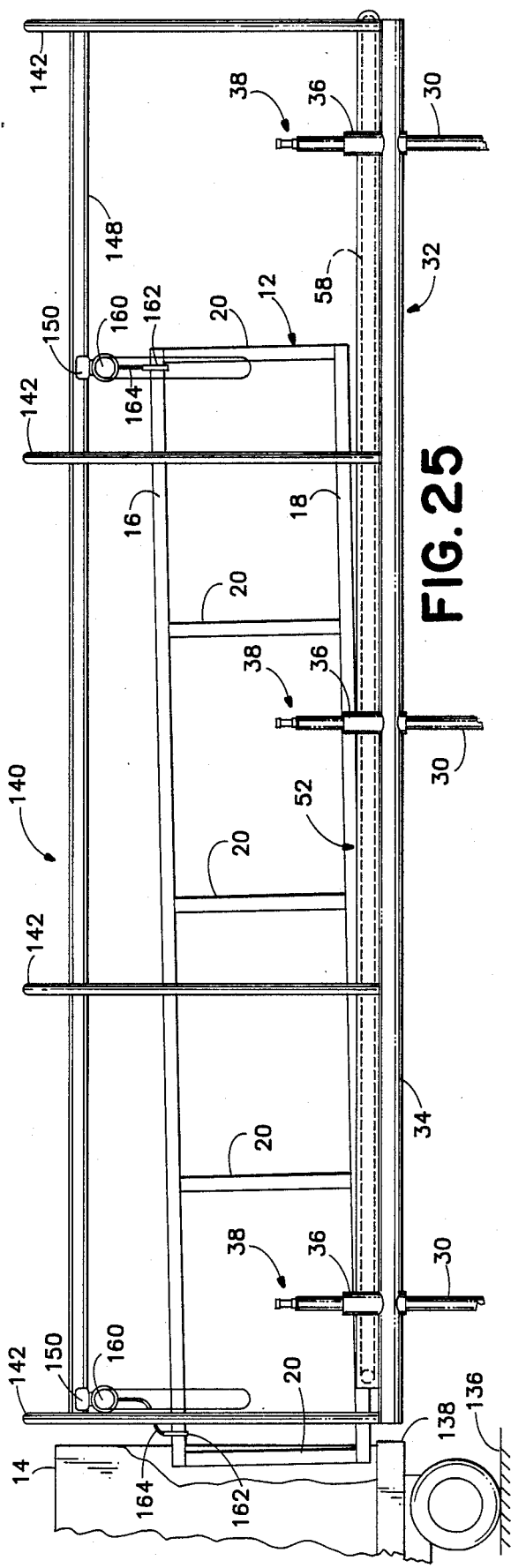

Chain drive systems 52, FIGS. 10 and 11, powered by motors 54, are mounted on the portions of the piston cylinders 48 which move with the tracks 46. Accordingly, the chain drive systems move in unison with the tracks. In order that the chain drive systems operate together, a rod 56 extends between the two motors. Each chain drive system 52 includes an endless chain 58 which is rotatably carried on sprockets 60 located at each end of the system. A trolley 62, having wheels 64 which ride in a channel 66, is attached to the chain 60 and moves with it. The trolley carries a coupling 68 which rides in the track 46 and has a pair of spaced-apart fingers 70 which engage the side 15 of the sleeve. A pin 71 fits through aligned openings 73 in the fingers and sleeve to couple them together. Thus, the chain drives can be used to pull a sleeve onto the tracks and push it back off of them, as will be more fully explained later.

Referring again to FIGS. 6 and 7, mounted on the frame 28, between the guide posts 30, is a lifting device 74 which is movable between a lowered position proximate the frame, FIGS. 2 and 4, and a raised position proximate the top of the guide posts, FIGS. 1 and 3. The lifting device includes a ramp 76 which will support a plurality of automobiles. In the embodiment illustrated, the ramp comprises a pair of spaced apart beams 75 each having a row of upstanding spaced apart plates 78 attached to it. Since the overall transverse dimension of the ramp need only be great enough to accommodate the wheels of the automobiles which are being loaded into the sleeves, the overall width of the ramp is less than the width of the sleeves. The ramp is attached to the frame through a pair of scissor lifts 80 which are operated simultaneously by a hydraulic cylinder 82 to raise and lower the lifting device. While scissor lifts are particularly suited for lifting automobiles, other devices such as jack screws or vertically-oriented hydraulic cylinders could serve this purpose as well.

Located at three positions longitudinally along the lifting device are a pair of transverse jackets 84, FIG. 6. In the embodiment illustrated the jackets are rectangular in cross section and each slidably carries a dog 86. The dog is movable by a hydraulic cylinder 88 between the extended position illustrated in FIG. 6, where it protrudes beyond the sides of the ramps 76, and a retracted position where it does not. The jackets in each pair are arranged oppositely one another so that the dog in one jacket in each pair extends from one side of the lifting device and the dog in the other jacket extends from the opposite side of the lifting device. The steps 45 in the guide posts 30 are arranged to prevent the sleeve supports 32 from dropping below the level of the lifting device when it is in its lowered position. Thus, the dogs 86 engage the sleeve supports 32 when they are extended and the lifting device is raised. As a result, the lifting device can be used to raise and lower the sleeve supports 32 on the guide posts. However, because the distance between the outside edges of the ramp 76 is less than the distance between the sides 15 of the sleeve 12, the lifting device will pass inside of the sleeve supports when the dogs are retracted.

Figure 5:
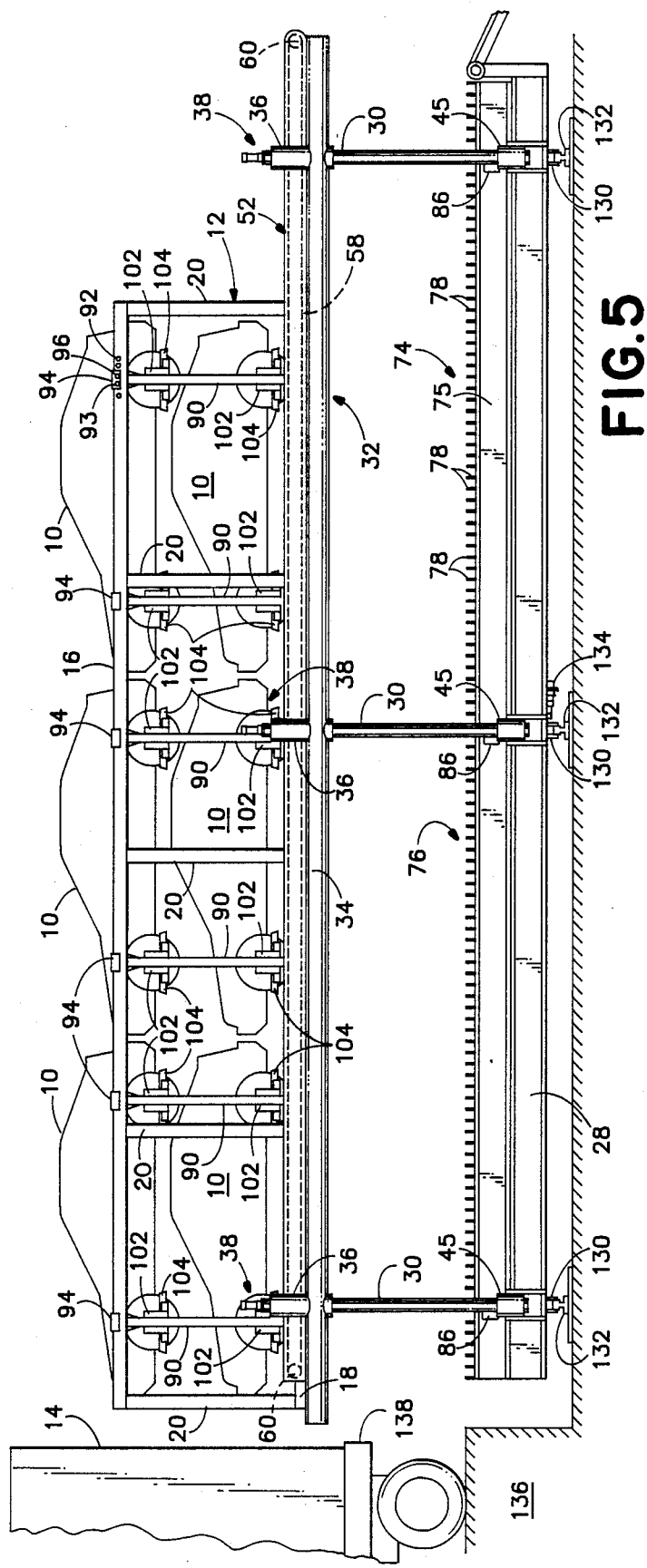
FIG. 5 is a side elevation view of the apparatus with both levels of automobiles attached to the sleeve prior to the sleeve being aligned with the truck trailer for reinsertion therein.

In order to attach the automobiles to the sleeve, a pair of tension members 90 is suspended from each of the top beams 16 of the sleeve for each car which is to be supported. The top beams have a plurality of holes 92 (see right sides of FIGS. 2, 3 and 5) extending through them which mate with holes 93 located in supports 94 at the tops of the tension members 90. Pins 96 fit through the aligned holes in the top beams and the supports to fix the tension members in each pair at the proper location along the sleeve, with the distance between the tension members equal to the distance between the vertical center lines of the wheels of the car which is being attached to the sleeve by them.

Figure 20:
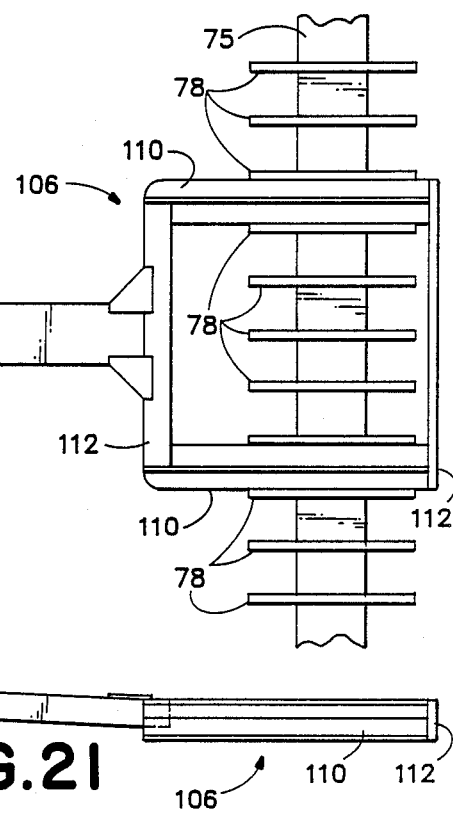
FIG. 20 is a plan view of a cradle which is an element of the present invention.
Figure 21:
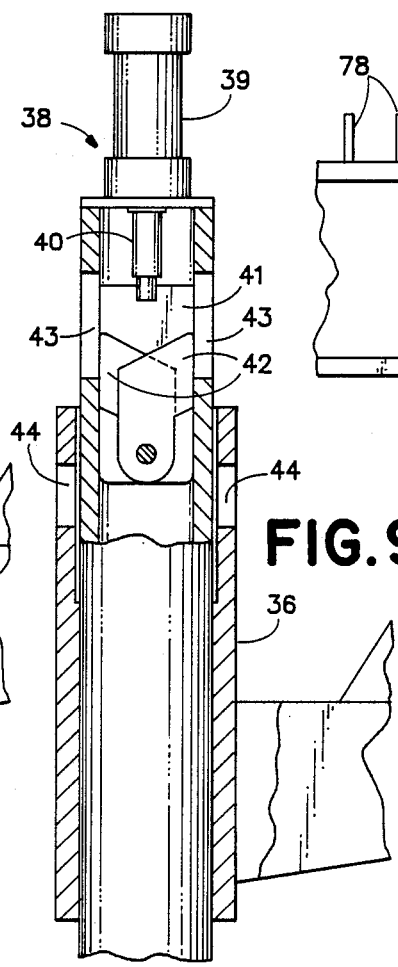
FIG. 21 is a side elevation view of the cradle of FIG. 20.
Figure 22:
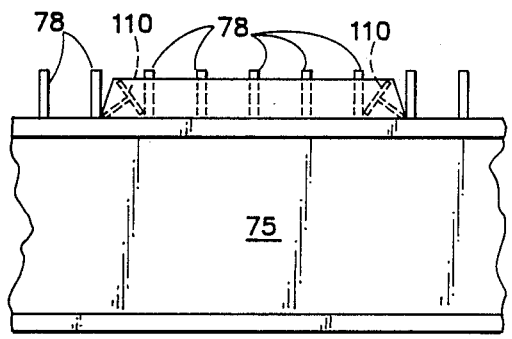
FIG. 22 is an end elevation view of the cradle of FIG. 20 in place on the lifting apparatus.

Referring now also to FIGS. 12-19, the tension members 90 also have a series of holes 98 extending through them into which pins 100 can be inserted. Suspended from the pins 100 are cradle latches 102a,b,c which support opposite ends of cradles 104 which are designed to support either of the front or rear wheels of an automobile. Referring to FIGS. 20-22, the cradle 104 comprises two pads 106 which are connected together by a cross tie 108. The cross tie 108 is bowed slightly so that it is higher at its center than at its ends. This provides extra clearance between a lower layer of automobiles and an upper layer of cradles. Each pad comprises front and rear tire-engaging chocks 110 which are supported on each of their ends by a support plate 112. The pads are separated from one another by a sufficient distance that the tires of the narrowest automobiles will fit onto them and are wide enough to allow them to support the widest automobiles. The chocks are separated from one another by a distance which will cause them to engage opposite sides of a tire and still fit between adjacent plates 78.

In order to facilitate the insertion of automobiles 10 into the sleeve 12, the cradle latches 102a,b,c are movable between latching positions where they protrude into the sleeve to engage a cradle 104 and loading positions where a cradle can be moved past them. In a first embodiment, illustrated in FIGS. 12 and 13, the cradle latch 102a comprises a shelf 114 which is arranged to engage the support plate 112 which is located at the outer extremities of the cradle. The shelf 114 has an open center portion 120 which is slightly wider than the tension member 90 and is rotatably attached to a hook portion 116 of a hanger by means of a hinge 118. Thus, the shelf can be rotated upwardly to a loading position, shown in phantom line in FIG. 12, where its open center 120 straddles the tension member 90.

In a second embodiment, illustrated in FIGS. 14, 15 and 16, the cradle latch 102b has a continuous shelf 114 In this embodiment the hook portion 116 of the cradle latch includes a pair of fingers 122 which extend horizontally outwardly from the tension member and have two sets of rectangular notches 124 formed in them. The shelf 114 has a pair of vertical straps 126 extending upwardly from it which have a bar 128 connected between them that is arranged to fit into the notches 124 When the bar 128 is in the outer set of notches the cradle latch is in its latching position, and when the bar is in the inner set of notches the cradle latch is in its loading position. The straps 126 are rotatably attached to the bar 128 and the shelf 114 by means of pins 129. Thus, the shelf 114 can swing laterally to permit placement of the cradles 104 in them when the tension members 90 are not exactly centered on the tires of an automobile. In addition, the pivotable shelf permits slight fore and aft movement of an automobile in the sleeve during transportation which cushions some of the shock imparted to the automobile and thus prevents it from being displaced from the cradles.

A third cradle latch 102c, which is illustrated in FIGS. 17-19, combines the continuous swinging shelf of the second embodiment with the liftable shelf of the first embodiment. In addition, as will be more fully explained below, the shelf lifting pivot is oriented to permit the shelf to be moved to its loading position by the cradle rather than requiring that it be moved manually. In this embodiment the hooks 116 are similar to the hooks in the other two embodiments. Connected to the hooks 116 is a horizontal bar 128 which has a pair of pins 129 extending outwardly from it which rotatably carry one of the ends of vertical straps 126. The other ends of the straps 126 also have pins 129 extending from them which rotatably carry a horizontal rod 131. Rotatably mounted on the rod 131, on each side of the pins 129, are collar segments 137 which are attached to the shelf 114. Thus, the shelf can be rotated between its normal operative position to a loading position shown in phantom line in FIG. 17. In addition, since the pivot is outwardly of the shelf the shelf will automatically be rotated to its loading position by the cradle when the cradle is moved upwardly past it in the sleeve. Stops 133, which extend outwardly from the straps 126, contact the shelf to orient it in its normal operating position. This embodiment of the cradle latch is shown with tie-down hooks 135, which are used to tie the tires of the automobiles to the frame. Similar hooks could be utilized with the other embodiments of the cradle latches. Clearly, many arrangements are available for providing a cradle latch which is movable between latching and loading positions, and the foregoing embodiments are only three of such arrangements.

Referring back to FIGS. 1-5, in operation a truck 138 carrying a cargo container 14 with an empty sleeve 12 is backed onto the platform 136 adjacent to the loader of the present invention. The dogs 86 in the lifting device 74 are moved to their extended positions below the sleeve supports 32, FIG. 6. The hydraulic cylinder 82 is then extended to cause the scissors lift 80 to lift the sleeve supports 32 until their tracks, 46 are aligned with the bottom of the cargo container, as shown in FIG. 1. When the tracks are aligned with the cargo container, the chain drive systems 52 are activated to move the trolleys 62, FIGS. 10 and 11, toward the truck until the fingers 70 of the couplings 68 engage the sides 15 of the sleeve. The couplings then are attached to the sleeve by insertion of the pins 72 which interconnect them. The chain drives then are moved in the opposite direction to pull the sleeve onto the sleeve supports with its wheels 27 rolling in the tracks 46. The lifting device then is raised again until the sleeve supports 32 are at the top of the guide posts 30. The latching assemblies 38 are engaged to lock the sleeve supports in this position and the dogs are retracted back into their sleeves and the lifting device is moved to its lowered position.

The apparatus is now ready to start loading automobiles into the sleeve. First, the sleeve must be prepared by installing tension members 90 on both sides of the sleeve at locations which will be centered on the wheels of the automobiles which are going to be loaded. Cradle latches, then, are placed on each of the tension members 90 at a level where the top layer of automobiles is to be placed in the sleeve. In addition, cradles 104 are placed on the ramp 76 with their chocks 110 being positioned between plates 78. Finally, automobiles 10 are driven onto the ramp 76 with their wheels positioned over the cradles 104, as shown in FIG. 2. When the top layer of automobiles is on the ramp, if the first two embodiments of the cradle latches are used, the cradle latches must be moved to their loading positions. The lifting device 74 then is raised until the cradles have moved past the cradle latches, and the cradle latches are moved back to their latching position. The lifting device then is lowered until the outer support plates 112 of the cradles engage the shelves 114 of the cradle latches and the automobiles are attached to the sleeve, FIG. 3.

The lifting device then is moved to its lowered position and a second set of cradle latches 102 is attached near the bottoms of the tension members 90 to accommodate a bottom layer of automobiles below the top layer. As was the case with the top layer of automobiles, the cradles which will support this layer of automobiles must be placed on the ramp before the automobiles are driven onto it, FIG. 4. The bottom layer of automobiles is raised by the lifting device and attached to the sleeve in the same manner as the top layer, FIG. 5.

After both layers of automobiles have been attached to the sleeve, the dogs 86 can again be moved to their extended position and the lifting device raised to bring the dogs into engagement with the sleeve supports 32. The latch assemblies 38 are released and the lifting device is moved to align the tracks 46 with the cargo container 14. The chain drive systems 52 are used again to push the loaded sleeve off of the tracks of the sleeve supports and back into the container. The loading apparatus can then be moved along the tracks 132 until it is aligned with another trailer so that a sleeve can be removed from that trailer for loading with automobiles.

The apparatus can also be used to unload automobiles from sleeves which are delivered to the site in cargo containers. This is accomplished by reversing the procedure described above.

Since the sleeves 12 can be collapsed to folded positions where their sides are adjacent to one another, the present invention also provides a mechanism which facilitates removing erected sleeves from a container and opening them or vice versa. Referring to FIGS. 23-28, a canopy 140 is attached to the top of the sleeve supports 32. In the embodiment illustrated the canopy comprises four inverted U-shaped brackets 142 each of which has a transverse I-beam 144 extending across its inside top edge. Slidably carried on each transverse I-beam 144 is a pair of transverse carriages 146, which in turn slidably carry a pair of longitudinal I-beams 148 that extend over the longitudinal extent of the sleeve support 32. Slidably mounted on each of the longitudinal I-beams 148 are two longitudinal carriages 150, each of which carries a chain hoist 160. A hook 162, attached to the extremities of each chain 164, is arranged to engage the top beams 16 of the sleeve.

Figure 26:
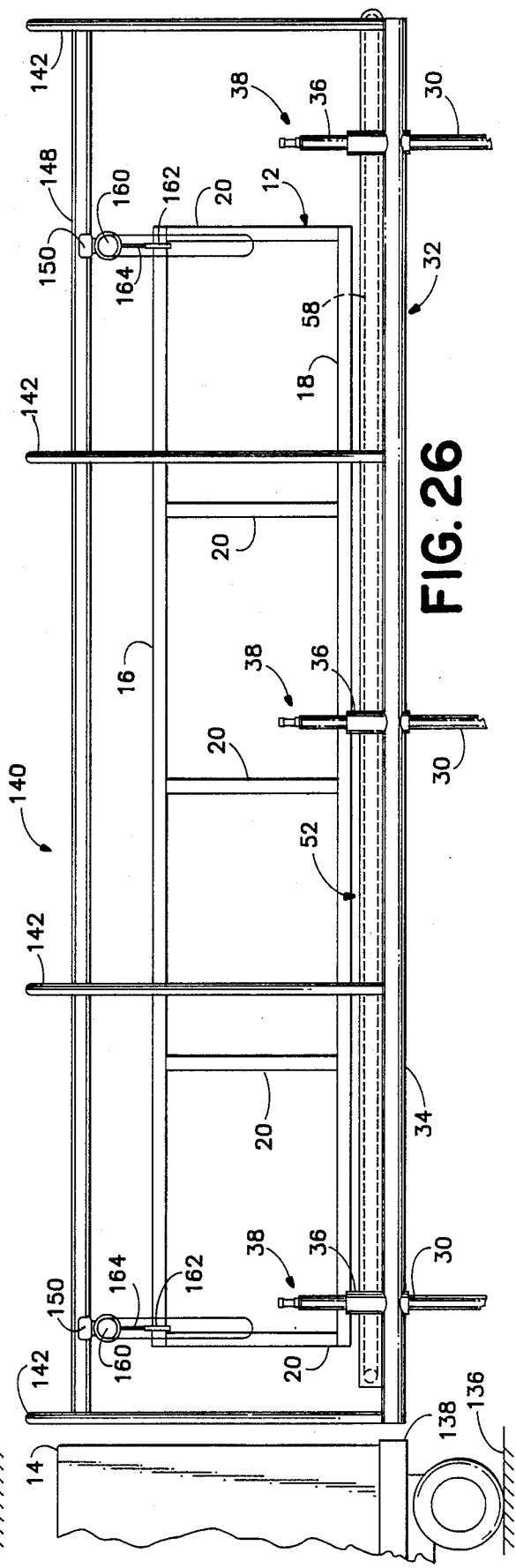
Figure 27:
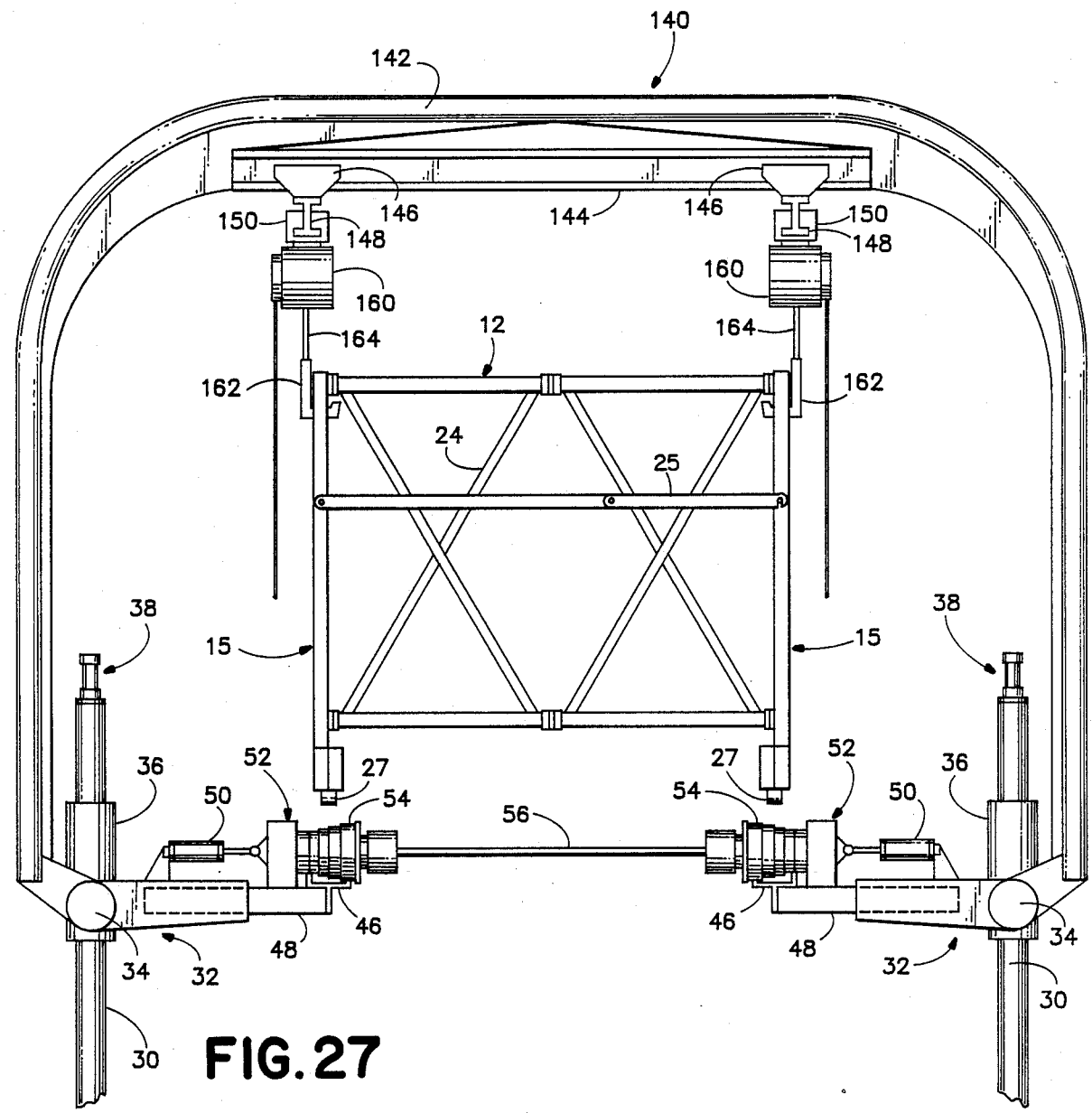
FIGS. 27 and 28 are end elevation views, at an enlarged scale, of the apparatus shown in FIGS. 23-26.

The method by which an erected sleeve 112 is removed from a cargo container 14 and collapsed is shown in FIGS. 23-28 of the drawings. The sleeve supports 32 first are raised by the lifting device 74 to a position where rails 34 are slightly below the bottom of the cargo container. All four of the longitudinal carriages 150 are moved to the end of the longitudinal I-beams 148 which is adjacent to the truck and the transverse carriages are moved to align them with the sides of the sleeve. The chains 164 on the two chain hoists 160 which are furthest from the truck are extended until their hooks 162 can be fastened onto the rear corners of the sleeve, as shown in FIG. 23. These chains are then retracted which pulls the sleeve partially out of the cargo container and raises its end, FIG. 24. The set of longitudinal carriages which supports the chain hoists which are connected to the sleeve then are moved along their longitudinal I-beams until the hooks from the other set of chain hoists can be attached to the other end of the sleeve, FIG. 25. The chains from these chain hoists are retracted then to pull the sleeve completely out of the cargo container and to raise its opposite end as shown in FIGS. 26 and 27.

Figure 28:
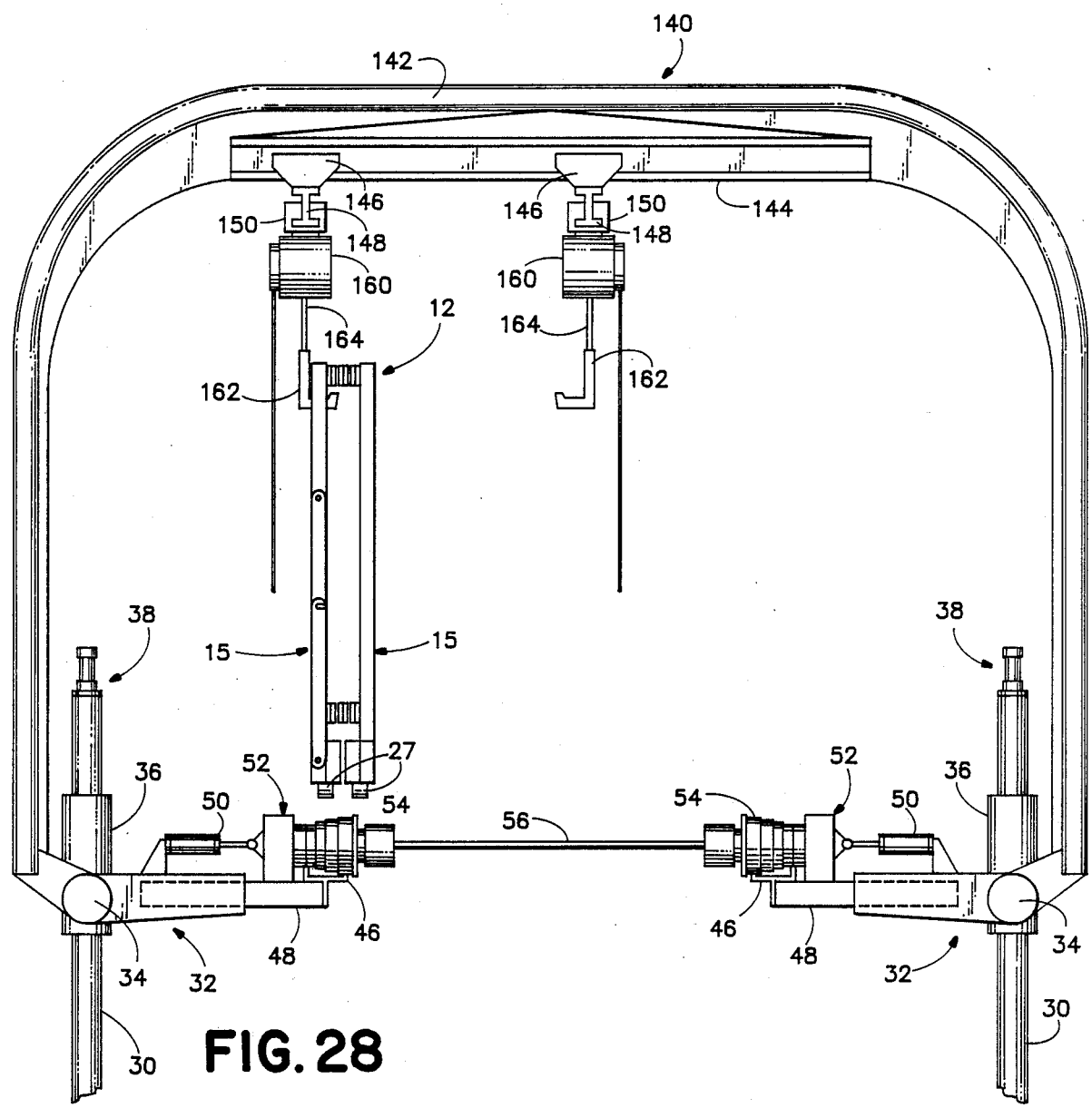

The transverse carriages 146 are then moved together as shown in FIG. 28 to collapse the sleeve to its folded position. The collapsed sleeve can then be inserted back into the cargo container or handled in some other manner. Also, once the sleeve is collapsed it can be moved side-to-side on the transverse carriages to accommodate storage of several collapsed sleeves in one cargo container.

Folded sleeves, located in a cargo container can be removed from the cargo container and expanded with the apparatus in much the same manner as discussed above.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. An apparatus for loading or unloading a lightweight sleeve which is capable of carrying a plurality of automobiles and being placed into an enclosed container, said apparatus comprising:
  (a) means for supporting a sleeve;
  (b) means, independent of said means for supporting a sleeve, for supporting a plurality of automobiles;
  (c) means for imparting relative movement to said sleeve supporting means and said automobile supporting means such that said automobiles are inserted into or removed from said sleeve from the bottom thereof;

(d) means for attaching the automobiles to said sleeve so that after automobiles have been inserted into said sleeve said automobile supporting means can be separated from said sleeve supporting means;

(e) means for moving the sleeve onto and off of said sleeve supporting means so that said sleeve and said automobiles can be placed into or removed from a container as a unit; and (f) wherein both said sleeve supporting means and said automobile supporting means are movable.

2. The apparatus of claim 1 wherein said sleeve supporting means comprises:

(a) a pair of spaced-apart track means for slidably engaging a sleeve on opposed edges thereof; and (b) guides which carry said track means and permit vertical movement of said track means.

3. The apparatus of claim 2 including means for locking said track means immovably to said guides.

4. The apparatus of claim 3 wherein said guides are upright posts.

5. The apparatus of claim 2 wherein said means for moving the sleeve comprises:

(a) a continuous chain associated with at least one of said track means;

(b) means for moving said chain in both directions; and (c) means for coupling said chain to said sleeve in a manner such that said sleeve will be pulled onto said tracks when said chain is moved in one direction and said sleeve will be pushed off of said tracks when said chain is moved in the opposite direction.

6. The apparatus of claim 2 wherein said automobile support means comprises a ramp which a plurality of automobiles can be placed on, and said means for imparting relative movement comprises a lifting device which can raise and lower said ramp relative to said track means.

7. The apparatus of claim 6 wherein said lifting device comprises a scissors lift.

8. The apparatus of claim 6 wherein said lifting device includes dogs which selectively couple said track means to said lifting device.

9. The apparatus of claim 6, including a frame which carries said guides, said ramp and said lifting device with said ramp being located between said track means.

10. The apparatus of claim 9, including means for translating said frame transversely to said track means.

11. The apparatus of claim 9, including means for changing distance between said track means.

12. The apparatus of claim 1 wherein said means for attaching the automobiles comprises:

(a) a pair of upright tension members which are arranged for attachment to opposed sides of the sleeve;

(b) a cradle having a width which is substantially equal to a width of the sleeve it will be used in, and having a pad located at each of its ends which is arranged to supportingly engage an automobile tire; and (c) hanger means for releasably fastening said cradle to said pair of tension members.

13. The apparatus of claim 12 wherein said tension members have a series of vertically spaced-apart holes defined therein and said hanger means comprises:

(a) pins which snugly fit in said holes;

(b) cradle latches having hook means for hanging said cradle latches on said pins inside of said sleeve, and shelves which engage said cradle.

14. The apparatus of claim 13 wherein said automobile support means comprises spaced-apart rows of side-by-side support plates which are separated from one another by a distance which will be permit said pads to be carried therebetween.

15. The apparatus of claim 14 wherein said cradle latches include means for displacing said hanger away from said automobile supporting means when said sleeve supporting means and said automobile supporting means are moved relative to one another.

16. The apparatus of claim 15 wherein said displacement means comprises a hinged joint which interfaces said hook means and said shelf.

17. The apparatus of claim 15 wherein said displacement means comprises a pair of fingers which protrude from said hook means and a bar which is located on said shelf, and means for releasably attaching said bar on said fingers at a first position wherein said shelf will engage said cradle and a second position where it will not.

18. A method for loading a container comprising:

(a) providing a lightweight sleeve which will carry a plurality of automobiles and which will fit into the container;

(b) placing said sleeve on tracks which are vertically movable on guides;

(c) attaching a lifting device to said tracks, raising said tracks to an elevated position, and then locking said tracks immovably to said guides at said elevated position;

(d) lowering said lifting device to a level below the bottom of said sleeve;

(e) placing a first group of automobiles on said lifting device;

(f) raising said lifting device to position said first group of automobiles into said sleeve;

(g) attaching said first group of automobiles releasably to said sleeve;

(h) attaching said lifting device again to said tracks, unlocking said tracks from said guides and using said lifting device to position said tracks at a level where said sleeve is aligned with the container; and (i) moving said sleeve off of said tracks into the container.

19. The method of claim 18, including, before the step of attaching said lifting device again to said tracks, the further steps of:

(a) lowering said lifting device to a level below said sleeve;

(b) placing a second group of automobiles on said lifting device;

(c) raising said lifting device to position said second group of automobiles into said sleeve below said first group of automobiles; and (d) attaching said second group of automobiles releasably to said sleeve.

20. The method of claim 18, including, before the step of placing said sleeve on said tracks, the further step of attaching said lifting device to said tracks and raising said tracks into alignment with a container carrying said sleeve.

21. An apparatus for loading or unloading a lightweight sleeve which is capable of carrying a plurality of automobiles and being placed into an enclosed container, said apparatus comprising:

(a) means for supporting a sleeve;

(b) means, independent of said means for supporting a sleeve, for supporting a plurality of automobiles;

(c) means for imparting relative movement to said sleeve supporting means and said automobile supporting means such that said automobiles are inserted into or removed from said sleeve from the bottom thereof;

(d) means for attaching the automobiles to said sleeve so that after automobiles have been inserted into said sleeve said automobile supporting means can be separated from said sleeve supporting means;

(e) means for moving the sleeve onto and off of said sleeve supporting means so that said sleeve and said automobiles can be placed into or removed from a container as a unit; and (f) wherein said sleeve supporting means includes a pair of spaced-apart track means for slidably engaging a sleeve on opposed edges thereof, and guides which carry said track means and permit vertical movement of said track means.

22. The apparatus of claim 21 including means for locking said track means immovably to said guides.

23. The apparatus of claim 22 wherein said guides are upright posts.

24. The apparatus of claim 21 wherein said means for moving the sleeve comprises:
(a) a continuous chain associated with at least one of said track means;
(b) means for moving said chain in both directions; and
(c) means for coupling said chain to said sleeve in a manner such that said sleeve will be pulled onto said tracks when said chain is moved in one direction and said sleeve will be pushed off of said tracks when said chain is moved in the opposite direction.

25. The apparatus of claim 21 wherein said automobile support means comprises a ramp which a plurality of automobiles can be placed on, and said means for imparting relative movement comprises a lifting device which can raise and lower said ramp relative to said track means.

26. The apparatus of claim 25 wherein said lifting means comprises a scissors lift.

27. The apparatus of claim 25 wherein said lifting device includes dogs which selectively coupled said track means to said lifting device.

28. The apparatus of claim 25 including a frame which carries said guides, said ramp and said lifting device with said ramp being located between said track means.

29. The apparatus of claim 28 including means for translating said frame transversely to said track means.

30. The apparatus of claim 28 including means for changing distance between said track means.

31. The apparatus of claim 21 wherein said means for attaching the automobiles comprises:
(a) a pair of upright tension members which are arranged for attachment to opposed sides of the sleeve;
(b) a cradle having a width which is substantially equal to a width of the sleeve it will be used in, and having a pad located at each of its ends which is arranged to supportingly engage an automobile tire; and
(c) hanger means for releasably fastening said cradle to said pair of tension members.

32. The apparatus of claim 31 wherein said tension members have a series of vertically spaced-apart holes defined therein and said hanger means comprises:
(a) pins which snugly fit in said holes;
(b) cradle latches having hook means for hanging said cradle latches on said pins inside of said sleeve, and shelves which engaged said cradle.

33. The apparatus of claim 32 wherein said automobile support means comprises spaced-apart rows of side-by side support plates which are separated from one another by a distance which will permit said pads to be carried therebetween.

34. The apparatus of claim 33 wherein said cradle latches include means for displacing said hanger away from said automobile support means when said sleeve supporting means and said automobile supporting means are moved relative to one another.

35. The apparatus of claim 34 wherein said displacement means comprises a hinged joint which interfaces said hook means in said shelf.

36. The apparatus of claim 34 wherein said displacement means comprises a pair of fingers which protrude from said hook means and a bar which is located on said shelf, and means for releasably attaching said bar on said fingers at a first position where said shelf will engage said cradle and a second position where it will not.

37. An apparatus for loading or unloading a lightweight sleeve which is capable of carrying a plurality of automobiles and being placed into an enclosed container, said apparatus comprising:
(a) means for supporting a sleeve;
(b) means, independent of said means for supporting a sleeve, for supporting a plurality of automobiles;
(c) means for imparting relative movement to said sleeve supporting means and said automobile supporting means such that said automobiles are inserted into or removed from said sleeve from the bottom thereof;
(d) means for attaching the automobiles to said sleeve so that after automobiles have been inserted into said sleeve said automobile supporting means can be separated from said sleeve supporting means;
(e) means for moving the sleeve onto and off of said sleeve supporting means so that said sleeve and said automobiles can be placed into or removed from a container as a unit; and
(f) wherein said means for attaching the automobiles includes:
  (i) a pair of upright tension members, having a series of vertically spaced-apart holes defined therein, which are arranged for attachment to opposed sides of the sleeve;
  (ii) a cradle having a width which is substantially equal to a width of the sleeve it will be used in, and having a pad located at each of its ends which is arranged to supportingly engage an automobile tire; and
  (iii) hanger means for releasably fastening said cradle to said pair of tension members, including pins which snugly fit in said holes, cradle latches having hook means for hanging said cradle latches on said pins inside of said sleeve, and shelves which engage said cradle;
(g) wherein said automobile support means includes spaced-apart rows of side-by-side support plates which are separated from one another by a distance which will permit said pads to be carried therebetween.

38. The apparatus of claim 37 wherein said cradle latches include means for displacing said hanger away from said automobile supporting means when said sleeve supporting means and said automobile supporting means are moved relative to one another.

39. The apparatus of claim 38 wherein said displacement means comprises a hinged joint which interfaces said hook means and said shelf.

40. The apparatus of claim 38 wherein said displacement means comprises a pair of fingers which protrude from said hook means and a bar which is located on said shelf, and means for releasably attaching said bar on said fingers at a first position where said shelf will engage said cradle and a second position where it will not.

* * * * *

UNITED STATES PATENT AND TRADEMARK OFFICE
CERTIFICATE OF CORRECTION

PATENT NO. : 4,919,582

DATED : April 24, 1990

INVENTOR(S) : H. John Bates et al.

It is certified that error appears in the above-identified patent and that said Letters Patent is hereby corrected as shown below:

| | |
|---|---|
| Col. 4, line 29 | Change "FIG. 3" to --FIG. 13-- |
| Col. 5, line 66 | Change "THe" to --The-- |
| Col. 7, line 14 | Change "steps" to --stops-- |
| Col. 8, line 8 | After "shelf 114" insert --.-- |
| Col. 8, line 15 | After "notches 124" insert --.-- |
| Col. 13, line 43 | Change "coupled" to --couple-- |
| Col. 14, line 6 | Change "side-by side" to --side-by-side-- |

Signed and Sealed this

Seventeenth Day of September, 1991

Attest:

HARRY F. MANBECK, JR.

Attesting Officer

Commissioner of Patents and Trademarks